US007017803B2

(12) United States Patent
Ichikawa et al.

(10) Patent No.: US 7,017,803 B2
(45) Date of Patent: Mar. 28, 2006

(54) POINT-OF-SALE TERMINAL

(75) Inventors: Toshiyuki Ichikawa, Tokyo (JP); Kenichi Miyazawa, Tokyo (JP); Noboru Ishii, Tokyo (JP); Takuma Yoshida, Tokyo (JP); Satoshi Nishioka, Tokyo (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 0 days.

(21) Appl. No.: 10/838,242

(22) Filed: May 5, 2004

(65) Prior Publication Data

US 2005/0156024 A1 Jul. 21, 2005

(30) Foreign Application Priority Data

Jan. 19, 2004 (JP) ............................ 2004-010944

(51) Int. Cl.
*G06F 17/60* (2006.01)

(52) U.S. Cl. ...................................... 235/379; 235/383

(58) Field of Classification Search ................ 235/379, 235/385, 383, 375; 705/27, 14, 26; 345/690, 345/659; 347/104, 108

See application file for complete search history.

(56) References Cited

U.S. PATENT DOCUMENTS

| | | | | |
|---|---|---|---|---|
| 5,731,829 | A * | 3/1998 | Saito et al. | 347/104 |
| 5,941,618 | A * | 8/1999 | Cheng | 312/223.2 |
| 6,085,972 | A * | 7/2000 | Wright | 235/375 |
| 6,625,581 | B1 * | 9/2003 | Perkowski | 705/27 |
| 6,781,604 | B1 * | 8/2004 | Poynter | 345/690 |

FOREIGN PATENT DOCUMENTS

| | | |
|---|---|---|
| JP | 8-305955 | 11/1996 |
| JP | 9-319968 | 12/1997 |
| JP | 2002-49967 | 2/2002 |
| JP | 2002-56460 | 2/2002 |
| JP | 2003-237487 | 8/2003 |

* cited by examiner

*Primary Examiner*—Thien M. Le
(74) *Attorney, Agent, or Firm*—Armstrong, Kratz, Quintos, Hanson & Brooks, LLP

(57) ABSTRACT

A POS terminal according to the present invention includes an LCD screen that displays information and tilts freely to a desirable position, a printer that prints the information on a paper, a paper discharge outlet from which the paper is discharged, and a controller that controls the POS terminal. The paper discharge outlet is provided in the main body at a position that is below the LCD screen.

17 Claims, 6 Drawing Sheets

POINT-OF-SALE TERMINAL

BACKGROUND OF THE INVENTION

1) Field of the Invention

The present invention relates to a point-of-sale (POS) terminal that is used in department stores, supermarkets, convenience stores, and the like.

2) Description of the Related Art

Conventionally, the POS terminal has been used for managing commodities and issuing receipts when the money for goods is paid at retail sales stores such as department stores, supermarkets, convenience stores. Because larger LCD screens provide better visibility and ease of operations, the POS terminals are provided with larger LCD screens.

A conventional POS terminal 100 will be explained below with reference to FIG. 8, which is a schematic perspective view, and a conventional POS terminal 110 will be explained below with reference to FIG. 9, which is a schematic perspective view.

The POS terminal 100 includes an LCD screen 200 that is used for a key-in operation (accounting or payment) by the operator, a main body 100*a*, a printer 400 that prints characters on a paper for printing, and a controller 500. The printer 400 is disposed above the LCD screen 200, and a receipt paper discharge outlet 450 is disposed near the printer 400. The angular position of the LCD screen 200 is adjustable backward to a desirable angle within a predetermined range (45 degrees to 90 degrees) by a hinge section 600 disposed at a lower part of the LCD screen 200.

The POS terminal 110 shown in FIG. 9 includes a large LCD screen 200, a main body 110*a*, a printer 400 that prints characters on the paper for printing, the controller 500, and a keyboard 700. The printer 400 having the receipt paper discharge outlet 450 is disposed near the LCD screen 200.

An audio-visual apparatus and an on-vehicle device such as global positioning system having a display section such as liquid crystal apparatus are disclosed in a Japanese Patent Application Laid Open 2003-237487, for example, as a conventional art of an information displaying apparatus having this type of LCD displaying section. The liquid crystal apparatus (displaying section) described in the conventional art is housed in the main body of the apparatus to make the apparatus compact.

In the case of the POS terminal 100 shown in FIG. 8, the LCD screen 200 and the printer 400 are disposed vertically; therefore, exchanging the paper for printing (rolled paper) and taking out the receipt from the paper discharge outlet 450 are troublesome, resulting in a poor user-friendliness.

In the case of the POS terminal 110 shown in FIG. 9, there is no special problem from the viewpoint of the user-friendliness; however, the POS terminal 110 becomes wider due to the horizontal disposition of the LCD screen 200 and the printer 400, which results in limited place for installation of the POS terminal 110.

SUMMARY OF THE INVENTION

It is an object of the present invention to solve at least the problems in the conventional technology.

A point-of-sale (POS) terminal according to an aspect of the present invention includes a main body; a liquid crystal display (LCD) screen that displays information; a printer that prints the information on a paper, wherein the printer is provided in a rear part of the LCD screen; a hinge section that rotatably links the LCD screen with the main body, wherein the hinge section rotatably links the LCD screen in such a manner that the LCD screen can be tilted freely to a desirable angle; and a paper discharge outlet to discharge the paper on which the information is printed by the printer, wherein the paper discharge outlet is provided in the main body at a position that is below the LCD screen.

A point-of-sale (POS) terminal according to another aspect of the present invention includes a main body; a cover; a hinge section that rotatably links the cover with the main body in such a manner that the cover can be rotated with respect to the main body between a closed position and an opened position; a liquid crystal display (LCD) screen that displays information, wherein the LCD screen is fixed to the cover; a printer that prints the information on a paper, wherein the printer is provided in the main body at a position that is below the cover when the cover is in the closed position; a paper discharge outlet to discharge the paper on which the information is printed by the printer, wherein the paper discharge outlet is provided in the main body at a position that is below the LCD screen when the cover is in the closed position.

A point-of-sale (POS) terminal according to still another aspect of the present invention includes a main body; a liquid crystal display (LCD) screen that displays information; a printer that prints the information on a paper, wherein the printer is provided in a rear part of the LCD screen; a hinge section that rotatably links the LCD screen with the main body; an LCD support member that supports the LCD screen to a desirable position; and a paper discharge outlet to discharge the paper on which the information is printed by the printer, wherein the paper discharge outlet is provided in the main body at a position that is below the LCD screen.

The other objects, features, and advantages of the present invention are specifically set forth in or will become apparent from the following detailed description of the invention when read in conjunction with the accompanying drawings.

DETAILED DESCRIPTION

Figure 1:
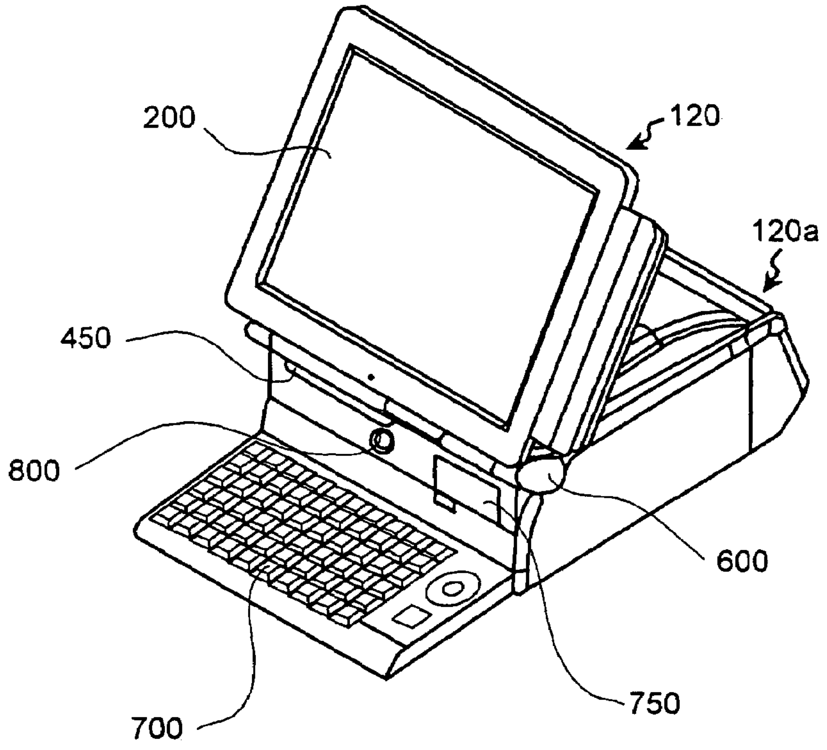
FIG. 1 is a schematic perspective view of a POS terminal according to a first embodiment of the present invention.
Figure 2:
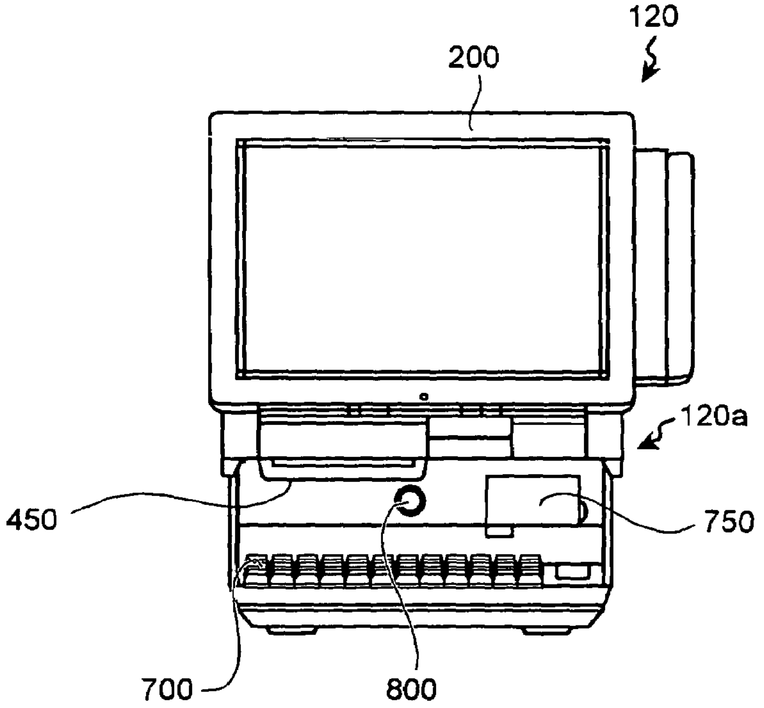
FIG. 2 is a schematic front view of the POS terminal shown in FIG. 1.
Figure 3A:
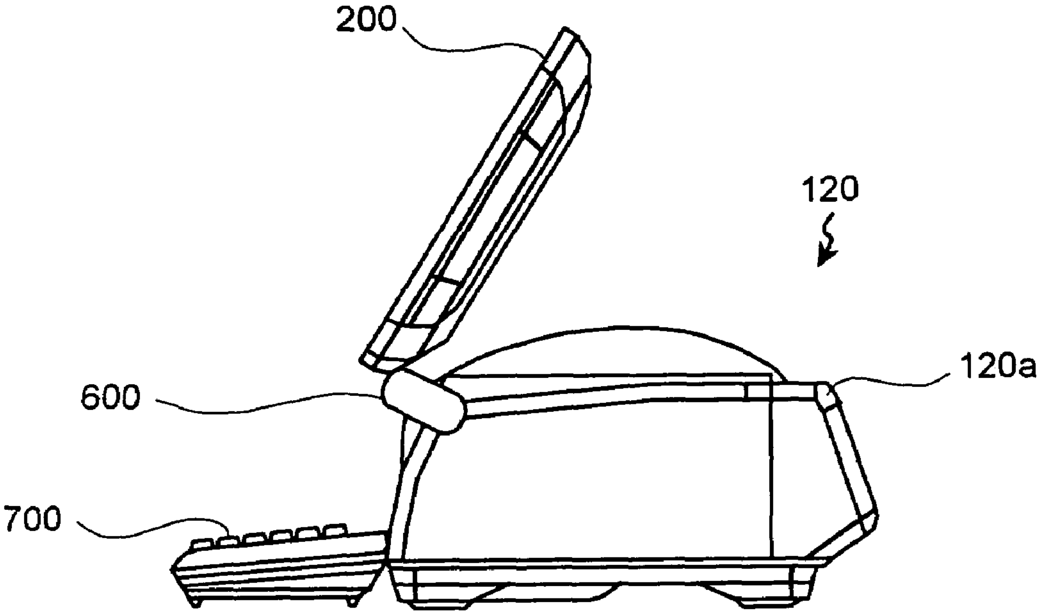
FIG. 3A is a schematic side view of the POS terminal shown in FIG. 1.
Figure 3B:
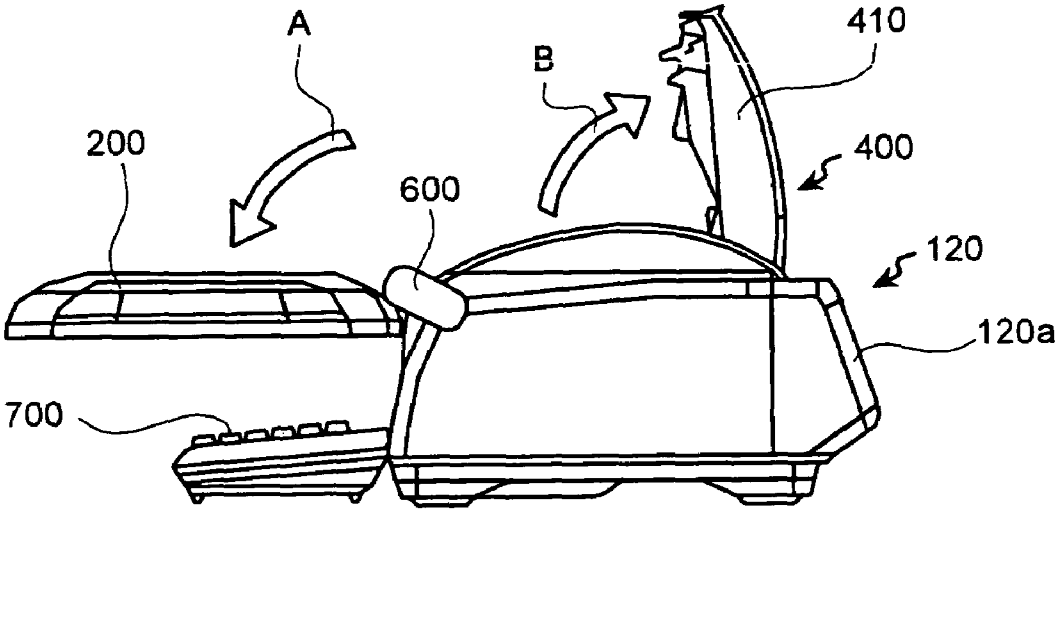
FIG. 3B is a schematic side view to depict how the cover is opened in the POS terminal shown in FIG. 1.
Figure 4:
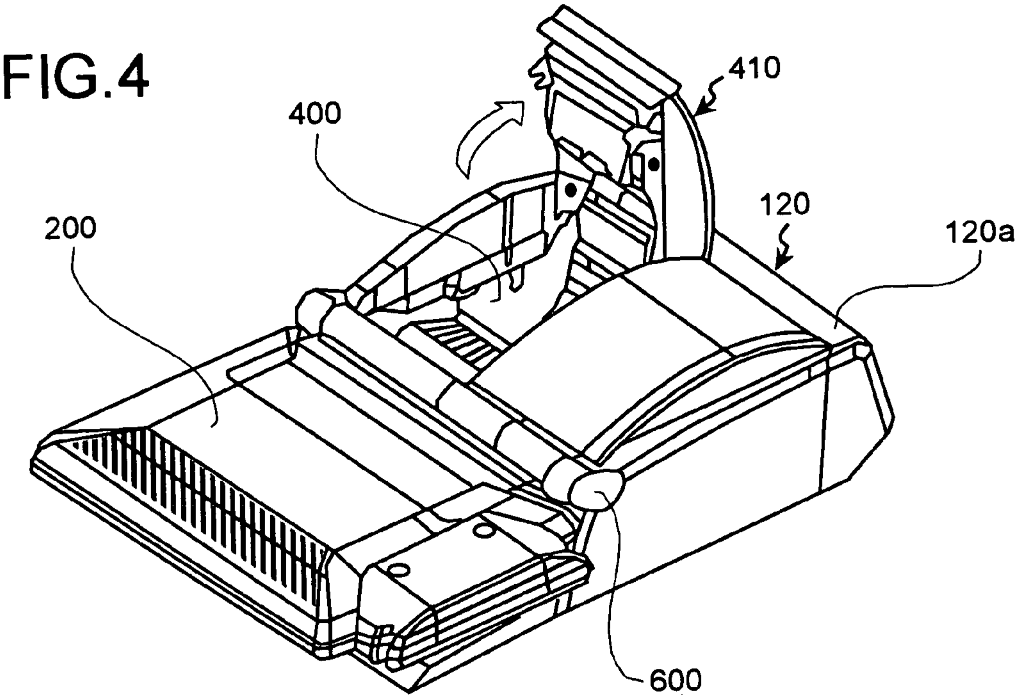
FIG. 4 is a schematic view of the POS terminal shown in FIG. 1 when the paper for printing is being exchanged.

Exemplary embodiments of the POS terminal according to the present invention will be explained below in detail with reference to the accompanying drawings. FIG. 1 is a schematic perspective view of a POS terminal according to a first embodiment of the present invention; FIG. 2 is a schematic front view of the POS terminal shown in FIG. 1; FIG. 3A is a schematic side view of the POS terminal shown in FIG. 1; FIG. 3B is a schematic side view of the POS terminal shown in FIG. 1 when the LCD screen is tilted; and FIG. 4 is a schematic view of the POS terminal shown in FIG. 1 when the paper for printing is being exchanged.

The POS terminal will be explained below on the assumption that the POS terminal is an information displaying apparatus. Structures and functions of the present invention are not limited to embodiments explained below.

A feature of the POS terminal 120 according to the present invention lies in the fact that main elements such as the LCD screen and the paper discharge outlet, which constitute the POS terminal 120, are disposed facing an operator. More particularly, the POS terminal 120 according to the present invention includes: an LCD screen 200 that displays the information; a printer 400 that prints the information and that is disposed in the rear part of the LCD screen 200; a controller 500 that controls the POS terminal 120; the paper discharge outlet 450 that is disposed below the LCD screen 200 to discharge the paper on which characters are printed; a main body 120*a*; and a keyboard 700.

The width of the LCD screen 200 is substantially the same as the width of the main body 120*a*. The hinge section 600 that links the LCD screen 200 with the main body 120*a* is disposed in a bottom part of the LCD screen 200, and the hinge section 600 is provided with a ratchet mechanism (not shown). The paper discharge outlet 450 to discharge the paper, such as receipt, is disposed below the LCD screen 200. The paper is discharged from the paper discharge outlet 450 toward the operator of the POS terminal 120.

An operation panel 750 and a feed switch 800 are disposed on the front of the main body 120*a* where the LCD screen 200 and the paper discharge outlet 450 are disposed.

The operator sets operational conditions of the POS terminal 120 using the operation panel 750. The feed switch 800 is operated by the operator when the operator wants to discharge the paper from the paper discharge outlet 450.

In the POS terminal 120, the LCD screen 200 can be tilted from a position where the operator usually operates the POS terminal 120 toward the operator in a direction shown by an arrow A, so that it is possible to open a printer cover 410 in a direction shown by an arrow B. As a result, as shown in FIG. 4, it is easy to charge and exchange the paper by opening the printer cover 410.

In the POS terminal 120 according to the first embodiment of the present invention, the main elements such as the LCD screen 200 and the paper discharge outlet 450 are disposed facing the operator, the paper discharge outlet 450 is disposed below the LCD screen 200, and the LCD screen 200 can be tilted toward the operator. As a result, exchanging the paper in the printer 400 becomes easy resulting in an improvement of user-friendliness.

Figure 5:
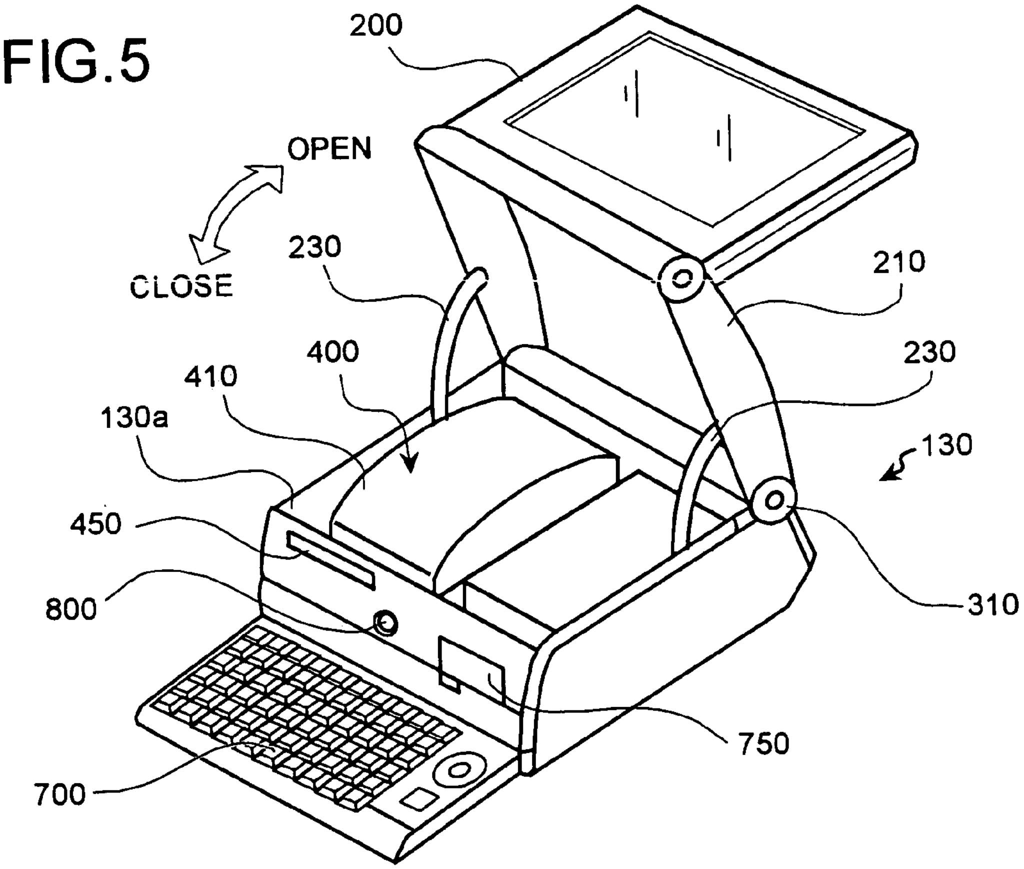
FIG. 5 is a schematic perspective view of a POS terminal according to a second embodiment of the present invention.

A POS terminal according to a second embodiment of the present invention will be explained in detail. FIG. 5 is a schematic perspective view of a POS terminal 130 according to the second embodiment. Namely, as shown in FIG. 5, the POS terminal 130 includes the LCD screen 200 that displays information, the printer 400 that prints the information, and the controller 500 that controls the POS terminal 130. A feature of the POS terminal 130 lies in the fact that the LCD screen 200 is fixed to a cover 210 that is disposed in such a manner that to be opened and closed with respect to a main body 130*a*.

Namely, the cover 210 is disposed in a position that covers an upper opening section of the main body 130*a*, and the both sides of the cover 210 are pivotally supported by a pivot 310, and the cover 210 can be opened and closed freely centering on the pivot 310. Two rotational arms 230 are disposed in a front part of the cover 120, and the cover 120 can be opened and closed to a desirable angle due to the rotational arms 230. In the POS terminal 130, charging or exchanging the paper in the printer 400 is carried out by opening the printer cover 410 when the cover 210 is open.

According to the POS terminal 130, the paper in the printer 400 is exchanged by opening the printer cover 410 when the cover 210 is open, and the paper is discharged from the paper discharge outlet 450. This allows user friendliness of the POS terminal 130 to be improved.

Figure 6A:
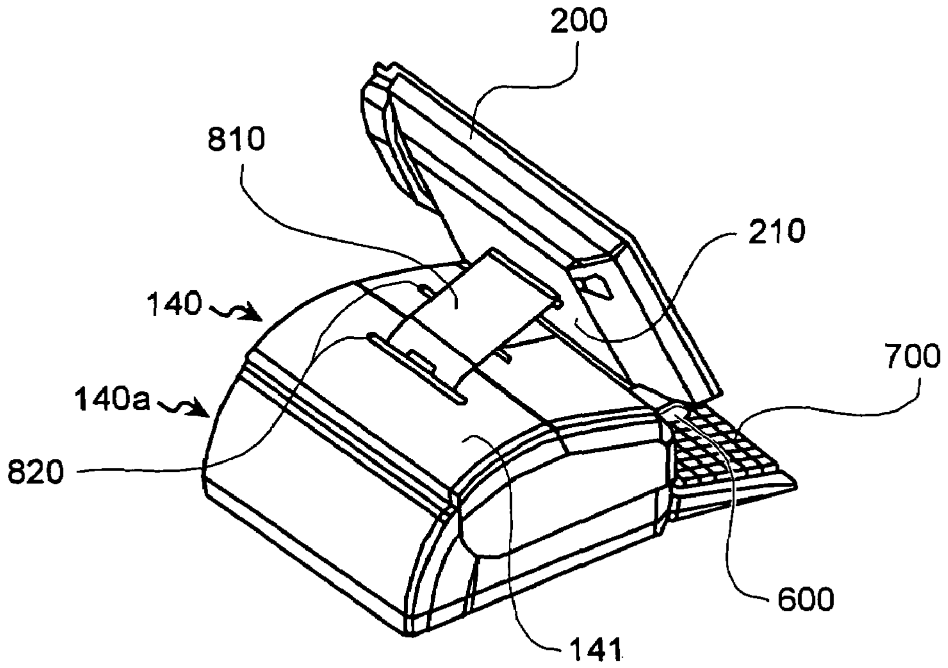
FIG. 6A is a schematic perspective view of a POS terminal according to a third embodiment of the present invention.
Figure 6B:
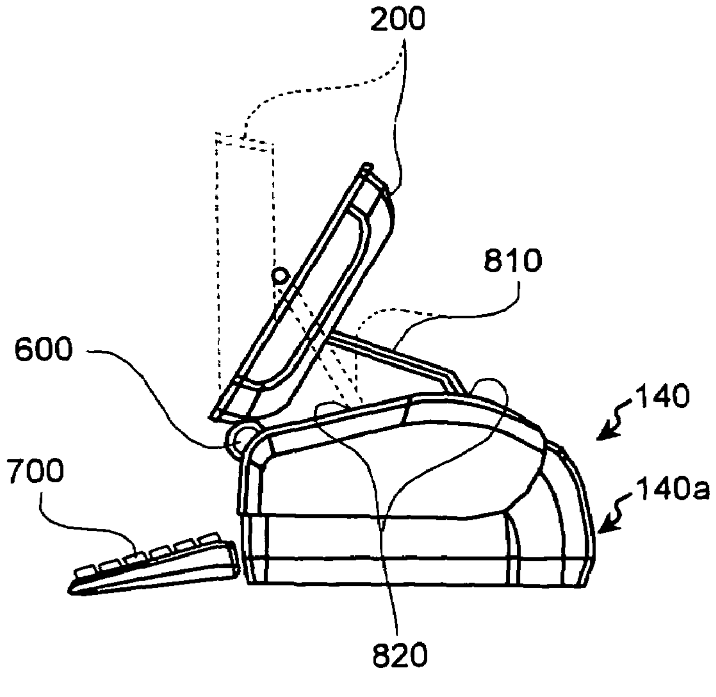
FIG. 6B is a schematic side view of the POS terminal shown in FIG. 6A.

A POS terminal according to a third embodiment of the present invention will be explained below in detail. FIG. 6A is a schematic perspective view (rear view) of a POS terminal 140 according to the third embodiment. FIG. 6B is a side view of the POS terminal 140.

The POS terminal 140 features: a rotational axis section 250 that rotatably moves the LCD screen 200, which is disposed in a hinge section 600 that links the LCD screen 200 with a main body 140*a*; an LCD screen supporting member 810 that controls and supports the LCD screen 200 to a desirable tilted position.

In other words, as shown in FIG. 6A and FIG. 6B, the POS terminal 140 includes the LCD screen supporting member 810 that controls the tilting angle of the LCD screen 200 and supports the LCD screen 200 at the desirable tilted position. Moreover, a locking unit 820 that sets a locking position of the LCD screen supporting member 810 is formed in a predetermined position on a surface of an upper cover 141 of the main body 140*a*.

Although a ratchet mechanism in the hinge section 600 is needed in the first and the second embodiments, no ratchet mechanism is needed in the third embodiment because controlling and supporting the LCD screen 200 to the desirable tilted position are carried out by a thrusting function of the LCD screen supporting member 810. In the third embodiment, the hinge section 600 is constituted of a simple rotating axis member without the ratchet mechanism. In the third embodiment, charging and exchanging the paper in the printer 400 is easily carried out by tilting the LCD screen 200 toward the front.

Figure 7A:
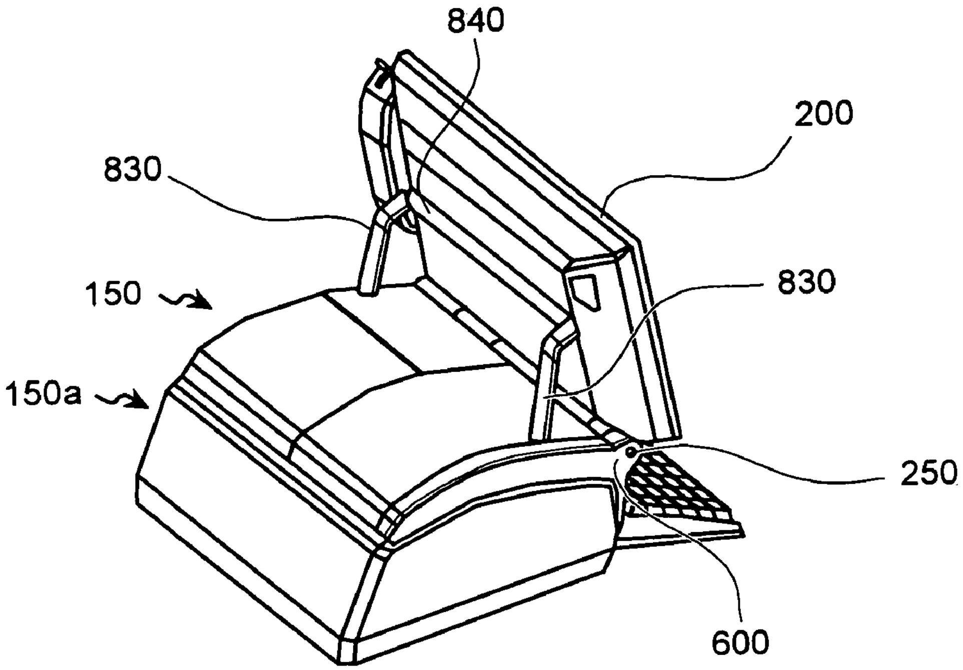
FIG. 7A is a schematic perspective view of a POS terminal according to a fourth embodiment of the present invention.
Figure 7B:
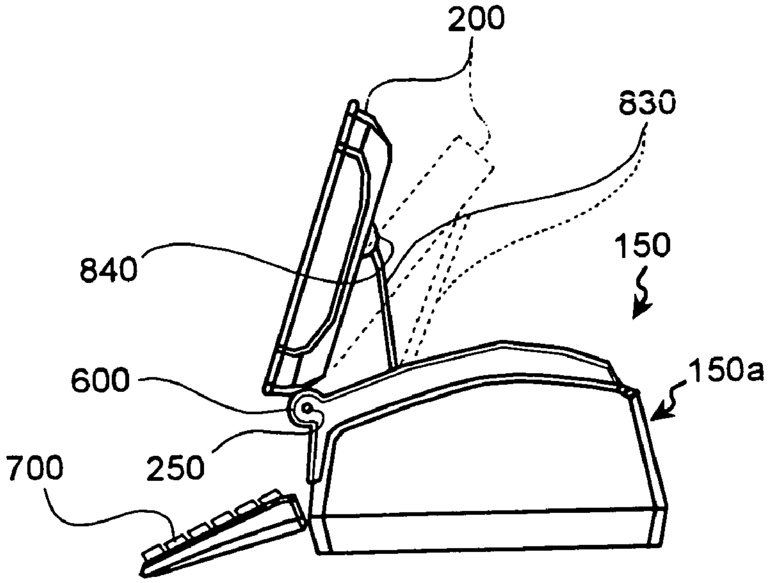
FIG. 7B is a schematic side view of the POS terminal shown in FIG. 7A.
Figure 8:
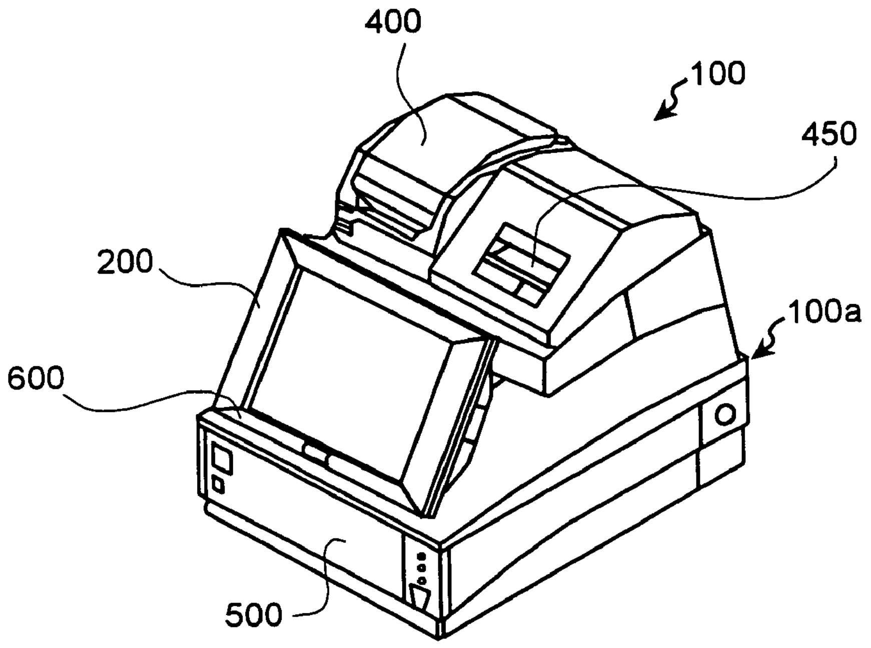
FIG. 8 is a schematic perspective view of a conventional POS terminal.
Figure 9:
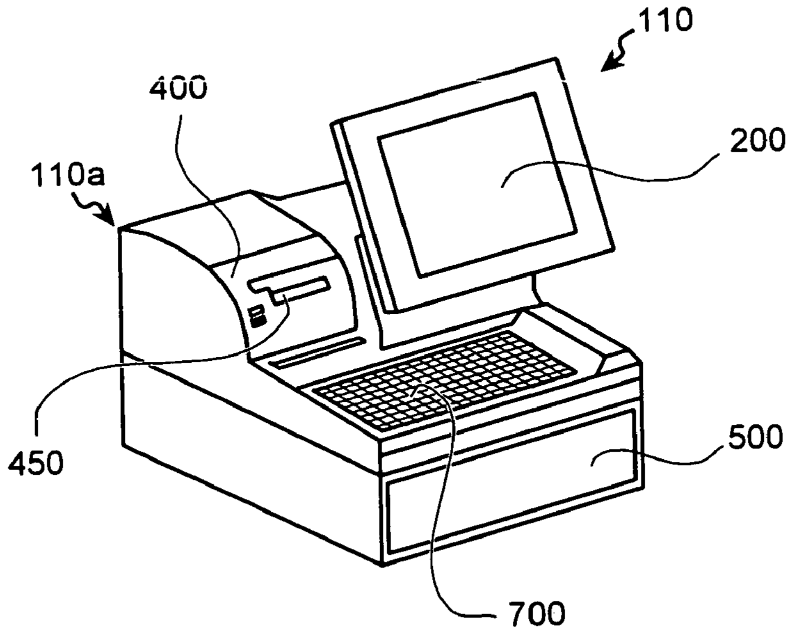
FIG. 9 is a schematic perspective view of another conventional POS terminal.

A POS terminal according to a fourth embodiment of the present invention will be explained below in detail. FIG. 7A is a schematic perspective view (rear view) of a POS terminal 150 according to the fourth embodiment. FIG. 7B is a schematic side view of the POS terminal 150.

Features of the POS terminal 150 according to the fourth embodiment of the present invention lie in the fact that the POS terminal 150 includes: a rotational axis section that rotatably moves the LCD screen 200 in the hinge section 600, and the hinge section links the LCD screen 200 with a main body 150*a*; two LCD screen support members 830 that are fixed to a predetermined part of the main body 150*a* to support the LCD screen 200; and a locking unit 840, in a rear part of the LCD screen 200, which sets the locking position of the LCD screen support members 830 in a predetermined position.

In other words, as shown in FIGS. 7A and 7B, the POS terminal 150 according to the fourth embodiment includes the LCD screen support members 830 that support the LCD screen 200 in such a manner that the LCD screen 200 can be tiled by a desirable angle. To be more particular, the LCD screen support members 830 are disposed and fixed to both sides of the main body 150*a*, and a locking unit 840 that sets the locking position of the LCD screen support members 830 is disposed at desirable positions in a rear part of the LCD screen 200.

In the fourth embodiment, the hinge section 600 is made up of a simple rotating axis member; because, the LCD screen 200 is supported in a tilted posture by the tilting supporting member 810. Even in the fourth embodiment, charging and exchanging the paper in the printer 400 is easily carried out by tilting the LCD screen 200 toward the front.

In the first to the fourth embodiments of the present invention, the POS terminals are explained on the assumption that the POS terminal is a typical example of the information displaying apparatus. However, the present invention can be applied to information display apparatuses, other than the POS terminals, that have the LCD screen.

According to the present invention, exchanging the paper in the printer is becomes easier, and the POS terminal becomes more user-friendly. Furthermore, the POS terminal can be installed even in a smaller space because the width of the main body is substantially the same as the width of the LCD screen. Moreover, the paper in the printer can be exchanged easily just by opening the cover. Furthermore, user-friendliness of the POS terminal is improved because the paper discharge outlet is disposed in the front part of the main body. Moreover, the POS terminal is manufactured at a low cost because the LCD screen is controlled and supported to the desirable tilting angle with a simpler structure. Furthermore, user-friendliness of the POS terminal is improved because the paper is discharged easily and securely by manual operation.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A point-of-sale (POS) terminal comprising:

a main body;

a liquid crystal display (LCD) screen that displays information;

a printer that prints the information on a paper, wherein the printer is provided in a rear part of the LCD screen;

a hinge section that rotatably links the LCD screen with the main body, wherein the hinge section rotatably links the LCD screen in such a manner that the LCD screen can be tilted freely to a desirable angle; and a paper discharge outlet to discharge the paper on which the information is printed by the printer, wherein the paper discharge outlet is provided in the main body facing the operator at a position that is below the LCD screen, and wherein the paper on which the information is printed by the printer is discharged toward an operator who operates the POS terminal.

2. The POS terminal according to claim 1, further comprising an operation panel to set an operational condition of the POS terminal, wherein the operation panel is provided in a front side of the main body where the LCD screen and the paper discharge outlet are provided.

3. The POS terminal according to claim 1, further comprising:

a paper discharge unit that discharges the paper from the paper discharge outlet; and a paper discharge switch that is operated to make the paper discharge unit to discharge the paper from the paper discharge outlet, wherein the paper discharge switch is provided in a front side of the main body where the LCD screen and the paper discharge outlet are provided.

4. The POS terminal according to claim 1, further comprising a hinge section that links the LCD screen with the main body has a ratchet mechanism.

5. A point-of-sale (POS) terminal comprising:

a main body;

a cover;

a hinge section that rotatably links the cover with the main body in such a manner that the cover can be rotated with respect to the main body between a closed position and an opened position;

a liquid crystal display (LCD) screen that displays information, wherein the LCD screen is fixed to the cover;

a printer that prints the information on a paper, wherein the printer is provided in the main body at a position that is below the cover when the cover is in the closed position;

a paper discharge outlet to discharge the paper on which the information is printed by the printer, wherein the paper discharge outlet is provided in the main body at a position that is below the LCD screen when the cover is in the closed position, and wherein the paper on which the information is printed by the printer is discharged toward an operator who operates the POS terminal.

6. The POS terminal according to claim 5, further comprising an operation panel to set an operational condition of the POS terminal, wherein the operation panel is provided in a front side of the main body where the LCD screen and the paper discharge outlet are provided.

7. The POS terminal according to claim 5, further comprising:

a paper discharge unit that discharges the paper from the paper discharge outlet; and a paper discharge switch that is operated to make the paper discharge unit to discharge the paper from the paper discharge outlet, wherein the paper discharge switch is provided in a front side of the main body where the LCD screen and the paper discharge outlet are provided.

8. The POS terminal according to claim 5, further comprising a hinge section that links the LCD screen with the main body has a ratchet mechanism.

9. A point-of-sale (POS) terminal comprising:

a main body;

a liquid crystal display (LCD) screen that displays information;

a printer that prints the information on a paper, wherein the printer is provided in a rear part of the LCD screen;

a hinge section that rotatably links the LCD screen with the main body;

an LCD support member that supports the LCD screen to a desirable position; and a paper discharge outlet to discharge the paper on which the information is printed by the printer, wherein the paper discharge outlet is provided in the main body at a position that is below the LCD screen; and wherein the paper on which the information is printed by the printer is discharged toward an operator who operates the POS terminal.

10. The POS terminal according to claim 9, wherein the LCD support member is fixed to the rear part of the LCD screen, and a locking unit that locks the support member to a desirable position is provided in a predetermined position of the main body.

11. The POS terminal according to claim 9, wherein the LCD support member is fixed to the main body, and a locking unit that locks the support member to a desirable position is provided in a rear part of the LCD screen.

12. The POS terminal according to claim 9, further comprising an operation panel to set an operational condition of the POS terminal, wherein the operation panel is provided in a front side of the main body where the LCD screen and the paper discharge outlet are provided.

13. The POS terminal according to claim 9, further comprising:

a paper discharge unit that discharges the paper from the paper discharge outlet; and a paper discharge switch that is operated to make the paper discharge unit to discharge the paper from the paper discharge outlet, wherein the paper discharge switch is provided in a front side of the main body where the LCD screen and the paper discharge outlet are provided.

14. The POS terminal according to claim 9, further comprising a hinge section that links the LCD screen with the main body has a ratchet mechanism.

15. The POS terminal according to claim 10, wherein the locking unit includes a plurality of grooves.

16. The POS terminal according to claim 10, wherein the locking unit includes a plurality of projections.

17. The POS terminal according to claim 11, wherein the locking unit includes a plurality of grooves.

* * * * *